(12) United States Patent
Furukawa

(10) Patent No.: US 11,376,891 B2
(45) Date of Patent: Jul. 5, 2022

(54) TYRE FOR WINTER

(71) Applicant: Sumitomo Rubber Industries, Ltd., Hyogo (JP)

(72) Inventor: Tatsuya Furukawa, Hyogo (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 381 days.

(21) Appl. No.: 16/280,208

(22) Filed: Feb. 20, 2019

(65) Prior Publication Data

US 2019/0263187 A1  Aug. 29, 2019

(30) Foreign Application Priority Data

Feb. 23, 2018 (JP) .............................. JP2018-030945

(51) Int. Cl.
*B60C 11/03* (2006.01)
*B60C 11/12* (2006.01)
*B60C 5/00* (2006.01)

(52) U.S. Cl.
CPC ...... *B60C 11/0309* (2013.01); *B60C 11/0302* (2013.01); *B60C 11/1236* (2013.01); *B60C 5/00* (2013.01); *B60C 2011/0365* (2013.01); *B60C 2011/0374* (2013.01); *B60C 2011/0376* (2013.01); *B60C 2011/0383* (2013.01); *B60C 2011/0388* (2013.01)

(58) Field of Classification Search
CPC ............. B60C 11/0302; B60C 11/0306; B60C 2011/0313; B60C 11/1236; B60C 2200/14; B60C 11/0309; B60C 2011/0337; B60C 2011/0358; B60C 2011/0374; B60C 2011/0381; B60C 2011/0383

USPC ..... 152/209.18, 28; D12/535–539, 551, 559, D12/560, 562, 586
See application file for complete search history.

(56) References Cited

U.S. PATENT DOCUMENTS

| D612,324 S | * | 3/2010 | Harvey | D12/551 |
| D720,683 S | * | 1/2015 | Boore | D12/563 |
| D733,639 S | * | 7/2015 | Fontaine | D12/563 |
| 2009/0272474 A1 | * | 11/2009 | Nagai | B60C 11/032 152/209.18 |

(Continued)

FOREIGN PATENT DOCUMENTS

| DE | 38 34 383 A1 | 4/1990 |
| EP | 2 460 672 A1 | 6/2012 |

(Continued)

OTHER PUBLICATIONS

Machine English Translation of JP-04224403-A (Year: 1992).*

(Continued)

*Primary Examiner* — Robert C Dye
*Assistant Examiner* — Edgaredmanuel Troche
(74) *Attorney, Agent, or Firm* — Studebaker & Brackett PC

(57) ABSTRACT

A tyre for winter comprises a tread portion 2 having a first tread edge (Te1) and a second tread edge (Te2) and sipes 40 provided in at least a part of the tread portion 2. The tread portion 2 is provided with a plurality of first oblique grooves (10A) each extending obliquely from the first tread edge (Te1) toward the second tread edge (Te2). Each of the first oblique grooves (10A) has an inner end (10a) terminating between a tyre equator (C) and the second tread edge (Te2). The inner end (10a) is not connected with other grooves.

19 Claims, 6 Drawing Sheets

(56) References Cited

U.S. PATENT DOCUMENTS

| | | | | |
|---|---|---|---|---|
| 2013/0087261 A1* | 4/2013 | Kageyama | .......... | B60C 11/0304 |
| | | | | 152/209.8 |
| 2016/0288580 A1* | 10/2016 | Higashiura | ......... | B60C 11/0302 |
| 2016/0318350 A1* | 11/2016 | Matsumoto | ........... | B60C 11/032 |
| 2018/0333993 A1* | 11/2018 | Fujimoto | ............ | B60C 11/0302 |

FOREIGN PATENT DOCUMENTS

| | | | | | |
|---|---|---|---|---|---|
| EP | 2460672 | A1 | * | 6/2012 | .......... B60C 11/125 |
| EP | 3 095 621 | A1 | | 11/2016 | |
| EP | 3150406 | A1 | * | 4/2017 | |
| EP | 3 403 852 | A1 | | 11/2018 | |
| JP | 02028006 | A | * | 1/1990 | ......... B60C 11/0302 |
| JP | 04224403 | A | * | 8/1992 | ......... B60C 11/0304 |
| JP | 2015-120381 | A | | 7/2015 | |

OTHER PUBLICATIONS

Machine English Translation of EP-2460672-A1 (Year: 2012).*
Machine English Translation of JP-02028006-A (Year: 1990).*
Machine English Translation of JP-04224403-A (On record, see Non-Final action dated Dec. 22, 2020). (Year: 1992).*
Washimi et al. (EP-3150406-A1); (Apr. 2017) (Year: 2017).*
The extended European search report issued by the European Patent Office dated Jul. 16, 2019, which corresponds to European Patent Application No. 19153357.9 and is related to U.S. Appl. No. 16/280,208.

* cited by examiner

TYRE FOR WINTER

TECHNICAL FIELD

The present invention relates to a winter tyre, and in particular, to a tyre suitable for an automobile for running on an icy/snowy road surface.

BACKGROUND ART

Japanese Unexamined Patent Publication No. 2015-120381 has proposed a tyre for winter provided in a tread portion thereof with first oblique main grooves and second oblique main grooves. Each of the first oblique main grooves extends obliquely from one of tread edges so as to cross a tyre equator to be connected with a respective one of the second oblique main grooves. Each of the second oblique main grooves extends obliquely from the other one of the tread edges so as to cross the tyre equator to be connected with a respective one of the first oblique main grooves.

SUMMARY OF THE INVENTION

In recent years, even in the tyres for winter, steering stability on a dry road surface is required. As a result of various experiments, the inventors have obtained a finding that on-ice/on-snow performance and the steering stability on a dry road surface can be improved by improving an arrangement and the like of inner ends of the oblique main grooves.

The present invention was made in view of the above, and a primary object thereof is to provide a tyre for winter capable of exerting excellent on-ice/on-snow performance and the steering stability on a dry road surface.

In one aspect of the present invention, a tyre comprises a tread portion having a first tread edge and a second tread edge and sipes provided in at least a part of the tread portion, wherein the tread portion is provided with a plurality of first oblique grooves each extending obliquely from the first tread edge toward the second tread edge, each of the first oblique grooves has an inner end terminating between a tyre equator and the second tread edge, and the inner end is not connected with other grooves.

In another aspect of the invention, it is preferred that each of the first oblique grooves has a main body portion and a widened portion connected with the main body portion on a side of the second tread edge, a groove width of the main body portion gradually decreases from the first tread edge toward the second tread edge, and a groove width of the widened portion is partially enlarged.

In another aspect of the invention, it is preferred that a maximum groove width of the widened portion is in a range of from 0.40 to 0.60 times a maximum groove width of the main body portion.

In another aspect of the invention, it is preferred that none of the first oblique grooves intersect with other grooves between the tyre equator and the second tread edge.

In another aspect of the invention, it is preferred that the tread portion includes a crown land region extending continuously over the entire circumference of the tyre without being divided by a groove having a larger groove width than that of each of the sipes, and a distance in a tyre axial direction between the tyre equator and the inner end is in a range of from 0.05 to 0.15 times a maximum width in the tyre axial direction of the crown land region.

In another aspect of the invention, it is preferred that the tread portion includes a plurality of joint grooves each connecting between the first oblique grooves adjacent to each other in a tyre circumferential direction and middle blocks divided by the first oblique grooves and the joint grooves, and each of the middle blocks is provided with a plurality of middle sipes each extending along one of the joint grooves respectively adjacent thereto.

In another aspect of the invention, it is preferred that the tread portion is provided with a plurality of second oblique grooves each extending obliquely from the second tread edge toward the first tread edge, each of the second oblique grooves has an inner end terminating between the tyre equator and the first tread edge, and the inner end of each of the second oblique grooves is not connected with other grooves.

DESCRIPTION OF THE PREFERRED EMBODIMENT

An embodiment of the present invention will now be described below in detail in conjunction with accompanying drawings.

Figure 1:
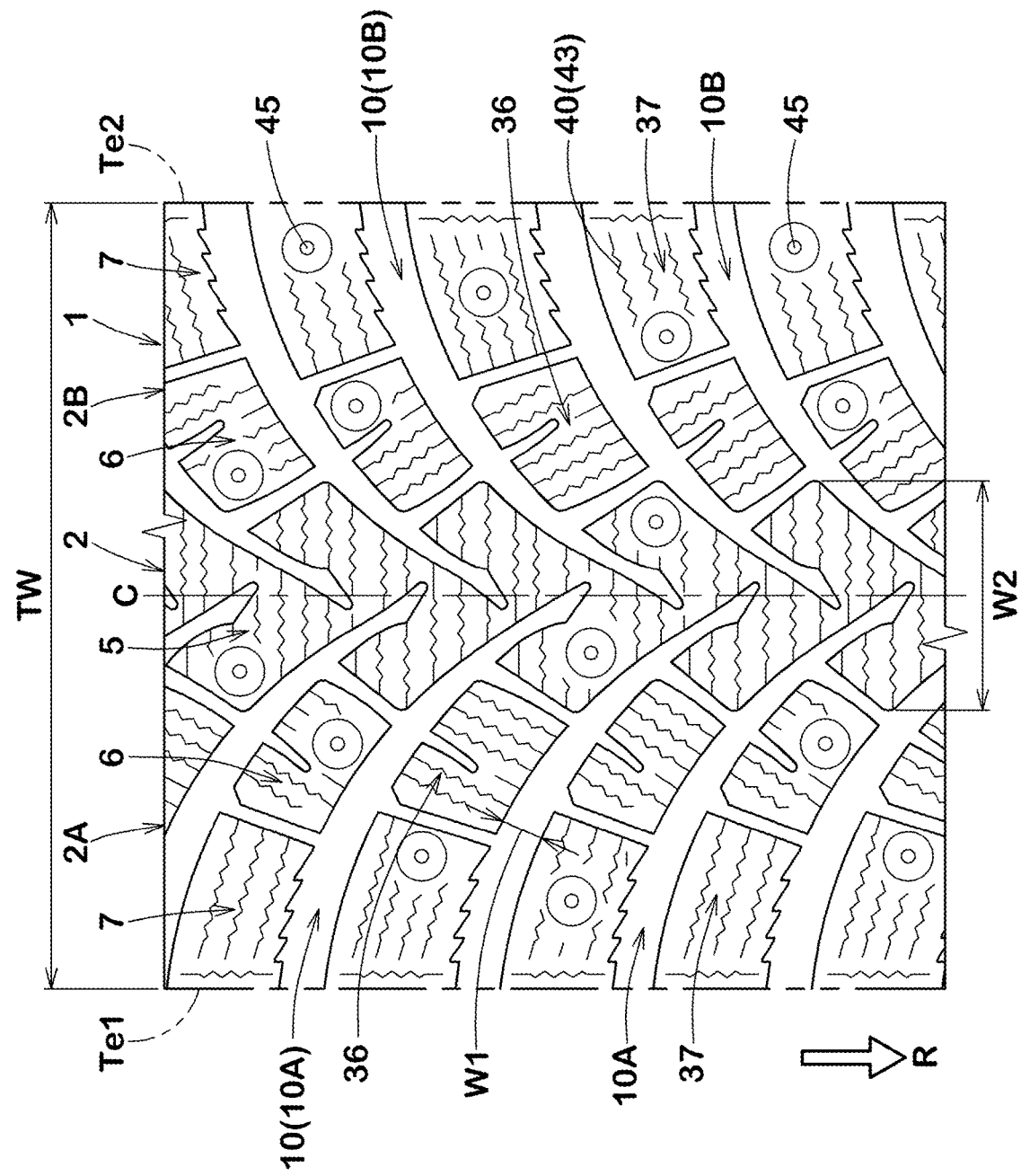
FIG. 1 is a development view of a tread portion of a tyre as an embodiment of the present invention.

FIG. 1 is a development view of a tread portion 2 of a tyre 1 for winter (hereinafter, may be simply referred to as "tyre 1") in this embodiment. As shown in FIG. 1, the tyre 1 for winter in this embodiment is a pneumatic tyre, for example, and preferably a tyre for a passenger car. However, the tyre 1 of the present invention is not limited to such an embodiment.

The tyre 1 in this embodiment has a directional pattern bound with an intended tyre rotational direction (R), for example. The tyre rotational direction (R) is indicated by one or more letters or symbols on at least one of sidewall portions (not shown), for example.

The tread portion 2 of the tyre 1 in this embodiment has a first tread edge (Te1) and a second tread edge (Te2). The tread portion 2 includes a first tread portion (2A) positioned between a tyre equator (C) and the first tread edge (Te1) and a second tread portion (2B) positioned between the tyre equator (C) and the second tread edge (Te2), for example. The first tread portion (2A) and the second tread portion (2B) are configured to be substantially line symmetrical except that they are displaced with each other in a tyre circumferential direction. Thereby, each configuration of the first tread portion (2A) can be applied to the second tread portion (2B).

The tyre 1 for winter in this embodiment is provided with sipes 40 in at least a part of the tread portion 2. Note that, in this specification, each of the sipes 40 means a cut or a groove having a width less than 1.5 mm. It is possible that the tread portion 2 having the sipes 40 provides high frictional force on an icy/snowy road surface.

In a case of a pneumatic tyre, the first tread edge (Te1) and the second tread edge (Te2) are defined as outermost ground contacting positions in a tyre axial direction when the tyre 1 in a standard state is in contact with a flat surface with zero camber angle by being loaded with a standard tyre load. The standard state is a state in which the tyre is mounted on a standard rim, inflated to a standard inner pressure, and loaded with no tyre load. In this specification, dimensions and the like of various parts of the tyre are those measured under the standard state unless noted otherwise.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with a plurality of oblique grooves 10. The oblique grooves 10 include first oblique grooves (10A) provided in the first tread portion (2A) and second oblique grooves (10B) provided in the second tread portion (2B), for example. Each of the first oblique grooves (10A) extends obliquely from the first tread edge (Te1) toward the tyre equator (C). Each of the second oblique grooves (10B) extends obliquely from the second tread edge (Te2) toward the tyre equator (C). Each of the second oblique grooves (10B) has substantially the same configuration as each of the first oblique grooves (10A). Thereby, the configurations of the first oblique grooves (10A) can be applied to the second oblique grooves (10B) unless noted otherwise. Each of the oblique grooves 10 forms a long snow block extending obliquely with respect to the tyre axial direction and then shears the snow block during running on a snowy road surface, therefore, it is possible that large traction on a snowy road surface is obtained.

In a preferred embodiment, each of the oblique grooves 10A and 10B is inclined to a heel side in the tyre rotational direction (R) as it goes from a respective one of the tread edges (Te1) and (Te2) toward the tyre equator (C). However, the present invention is not limited to such an embodiment.

It is preferred that a groove width (W1) of each of the oblique grooves 10 is in the range of from 2.0% to 6.0% of a tread width (TW), for example. In a case of a pneumatic tyre, a depth of each of the oblique grooves 10 is in the range of from 6.0 to 12.0 mm, and preferably in the range of from 8.0 to 10.0 mm, for example. The tread width (TW) is a distance in the tyre axial direction between the first tread edge (Te1) and the second tread edge (Te2) of the tyre in the standard state.

Figure 2:
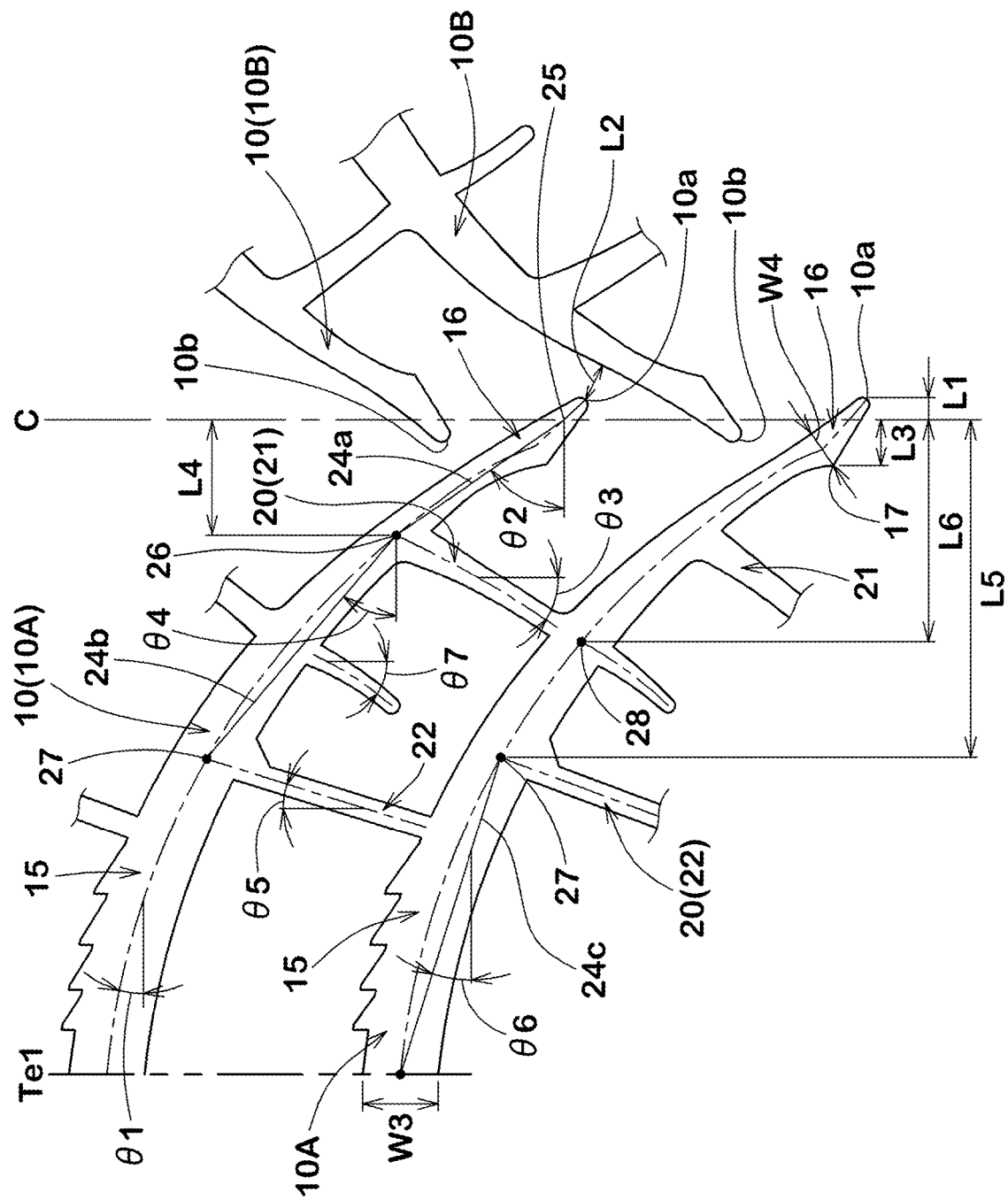
FIG. 2 is an enlarged view of contours of first oblique main grooves of FIG. 1.

FIG. 2 is an enlarged view of contours of the first oblique grooves (10A). As shown in FIG. 2, each of the first oblique grooves (10A) has an inner end (10a) terminating between the tyre equator (C) and the second tread edge (Te2). Each of the first oblique grooves (10A) is configured such that the inner end (10a) is not connected with other grooves. Note that "other grooves" means those having a width not less than 1.5 mm and sipes having a width less than 1.5 mm is excluded.

The first oblique grooves (10A) configured as such form hard snow blocks in the vicinity of the tyre equator (C) to which high ground contact pressure is applied, therefore, it is possible that large snow shearing force is provided. On the other hand, the inner ends (10a) of the first oblique grooves (10A) are not connected with other grooves, therefore, decrease in rigidity of a land region in the vicinity of the inner ends (10a) is suppressed, thereby, it is possible that the steering stability on a dry road surface is improved eventually.

In a preferred embodiment, the second oblique grooves (10B) are configured similarly. Specifically, each of the second oblique grooves (10B) has an inner end (10b) terminating between the tyre equator (C) and the first tread edge (Te1) and the inner end (10b) is not connected with other grooves. It is possible that the second oblique grooves (10B) configured as such further increase the effects described above.

It is preferred that each of the first oblique grooves (10A) does not intersect with other grooves between the tyre equator (C) and the second tread edge (Te2), for example. In a more preferred embodiment, each of the first oblique grooves (10A) terminates between the tyre equator (C) and the second tread edge (Te2) without being connected with other grooves. However, the present invention is not limited to such an embodiment, and the effects described above can be expected as long as the inner ends (10a) terminate without being connected with other grooves.

It is preferred that the inner ends (10a) of the first oblique grooves (10A) are arranged on a side of the tyre equator (C) of a center position in the tyre axial direction of the second tread portion (2B), for example. It is preferred that a distance (L1) in the tyre axial direction between the tyre equator (C) and the inner end (10a) of each of the first oblique grooves (10A) is in the range of from 0.05 to 0.15 times a maximum width (W2) (shown in FIG. 1) in the tyre axial direction of a crown land region 5, for example. Note that the crown land region 5 is a land region positioned at a center portion in the tyre axial direction of the tread portion 2. Further, the crown land region 5 in this embodiment extends continuously over the entire circumference of the tyre 1 without being divided by a groove having a larger groove width than that of each of the sipes 40.

The first oblique grooves (10A) in this embodiment terminate before reaching the second oblique grooves (10B) so as not to intersect with any of them. It is preferred that a distance (L2) between the inner end (10a) of each of the first oblique grooves (10A) and one of the second oblique grooves (10B) adjacent thereto is larger than the distance (L1) in the tyre axial direction between the tyre equator (C) and the inner end (10a) of each of the first oblique grooves (10A), for example. Specifically, it is preferred that the distance (L2) is in the range of from 1.5 to 2.0 times the distance (L1), for example.

Each of the first oblique grooves (10A) has a main body portion 15 and a widened portion 16 connected with the main body portion 15 on a side of the second tread edge (Te2), for example. The main body portion has a groove width gradually decreasing from the first tread edge (Te1) toward the second tread edge, for example. Thereby, the main body portion 15 has a maximum groove width (W3) on the first tread edge (Te1).

The main body portion 15 and the widened portion 16 are curved such that an angle θ1 with respect to the tyre axial direction gradually increases toward the side of the tyre equator (C), for example. It is preferred that the angle θ1 is in the range of from 5 to 75 degrees, for example. It is possible that the main body portion 15 and the widened portion 16 configured as such exert the snow shearing force in the tyre axial direction as well during running on an icy/snowy road surface.

In the widened portion 16, a groove width thereof is partially enlarged, for example. In the oblique grooves 10 including the widened portions 16 configured as such, it is possible that volume of the snow blocks formed in the vicinity of the tyre equator (C) to which large contact pressure is applied is increased, therefore, larger snow shearing force can be expected.

It is preferred that a maximum groove width (W4) of the widened portion 16 is in a range of from 0.40 to 0.60 times the maximum groove width (W3) of the main body portion 15, for example. With the widened portions 16 configured as such, it is possible that the on-ice/on-snow performance is improved while uneven wear of the crown land region 5 is suppressed.

Each of the widened portion 16 is provided between the tyre equator (C) and the first tread edge (Te1), for example. In a preferred embodiment, each of the widened portion 16 is provided between the tyre equator (C) and a center position in the tyre axial direction of the first tread portion (2A). It is preferred that a distance (L3) in the tyre axial direction between the tyre equator (C) and an apex 17 of each of the widened portions 16 is larger than the distance (L1) in the tyre axial direction between the tyre equator (C) and the inner end (10a) of each of the first oblique grooves (10A), for example. Each of the widened portions 16 has the maximum groove width (W4) at the apex 17. Specifically, it is preferred that the distance (L3) is in the range of from 2.0 to 4.0 times the distance (L1), for example. Thereby, large snow blocks are formed in the vicinity of the tyre equator (C), therefore, excellent on-ice/on-snow performance is obtained.

In a preferred embodiment, between a pair of the oblique grooves 10 adjacent to each other in the tyre circumferential direction, one or a plurality of joint grooves 20 each connecting between the pair of the oblique grooves 10 are provided. In this embodiment, two joint grooves 20 are provided between a pair of the oblique grooves 10.

It is preferred that each of the joint grooves 20 is inclined in an opposite direction to the oblique grooves 10, for example. In other words, it is preferred that each of the joint grooves 20 is inclined to the side of the tyre equator (C) as it goes in a direction opposite to the tyre rotational direction (R).

The joint grooves 20 include first joint grooves 21 and second joint grooves 22, for example. The first joint grooves 21 are provided closest to the tyre equator (C) among the plurality of the joint grooves 20 each arranged between adjacent oblique grooves 10, for example. Each of the second joint grooves 22 is arranged on an outer side in the tyre axial direction of a respective one of the first joint grooves 21. The second joint grooves 22 in this embodiment are provided closest to the first tread edge (Te1) among the plurality of the joint grooves 20, for example.

An intersection point of a groove center line of each of the oblique grooves 10 (the first oblique grooves (10A) in this explanation) and an extension line of a groove center line of one of the first joint grooves 21 connected with a respective one of the oblique grooves 10 (the first oblique grooves (10A) in this explanation) on the heel side in the tyre rotational direction (R) is defined as a first intersection point 26. A distance (L4) in the tyre axial direction between the tyre equator (C) and each of the first intersection points 26 is in a range of from 0.05 to 0.15 times the tread width (TW), for example. In a preferred embodiment, the distance (L4) is larger than the distance (L1) between the inner end (10a) of each of the first oblique grooves (10A).

It is preferred that an angle θ2 of a first straight line (24a) with respect to the tyre axial direction is in a range of from 45 to 65 degrees, for example. The first straight line (24a) extends between the first intersection point 26 and an intersection point 25 of the groove center line of each of the first oblique grooves (10A) and the tyre equator (C). With such an arrangement of the first oblique grooves (10A) and the first joint grooves 21, it is possible that excellent traction performance and cornering performance are exerted on an icy/snowy road surface.

It is preferred that each of the first joint grooves 21 is inclined at an angle θ3 in a range of from 30 to 50 degrees with respect to the tyre circumferential direction, for example. It is possible that the first joint grooves 21 configured as such provide the snow shearing force in a good balance in the tyre circumferential direction and the tyre axial direction.

An intersection point of the groove center line of each of the oblique grooves 10 (the first oblique grooves (10A) in this explanation) and an extension line of a groove center line of one of the second joint grooves 22 connected with a respective one of the oblique grooves 10 (the first oblique grooves (10A) in this explanation) on the heel side in the tyre rotational direction (R) is defined as a second intersection point 27. A distance (L5) in the tyre axial direction between the tyre equator (C) and each of the second intersection points 27 is in a range of from 0.22 to 0.35 times the tread width (TW), for example.

It is preferred that an angle θ4 with respect to the tyre axial direction of a second straight line (24b) extending between the first intersection point 26 and the second intersection point 27 is in a range of from 35 to 45 degrees, for example.

It is preferred that each of the second joint grooves 22 is inclined at an angle θ5 smaller than the inclination angle of each of the first joint grooves 21 with respect to the tyre circumferential direction, for example. Specifically, it is preferred that the angle θ5 of each of the second joint grooves 22 with respect to the tyre circumferential direction is in a range of from 10 to 30 degrees, for example. Thereby, the cornering performance on an icy/snowy road surface is further improved.

It is preferred that an angle θ6 of a third straight line (24c) with respect to the tyre axial direction is in a range of from 10 to 20 degrees, for example. The third straight line (24c) extends between the second intersection point 27 of each of the oblique grooves 10 (the first oblique grooves (10A) in this explanation) and an intersection point of the groove center line of a respective one of the oblique grooves 10 (the first oblique grooves (10A) in this explanation) and one of the tread edges adjacent thereto (the first tread edge (Te1) in this explanation). Thereby, excellent traction performance is exerted on an icy/snowy road surface.

As shown in FIG. 1, the tread portion 2 has the crown land region 5, middle block rows 6, and shoulder block rows 7 by provision of the grooves described above, for example.

Figure 3:
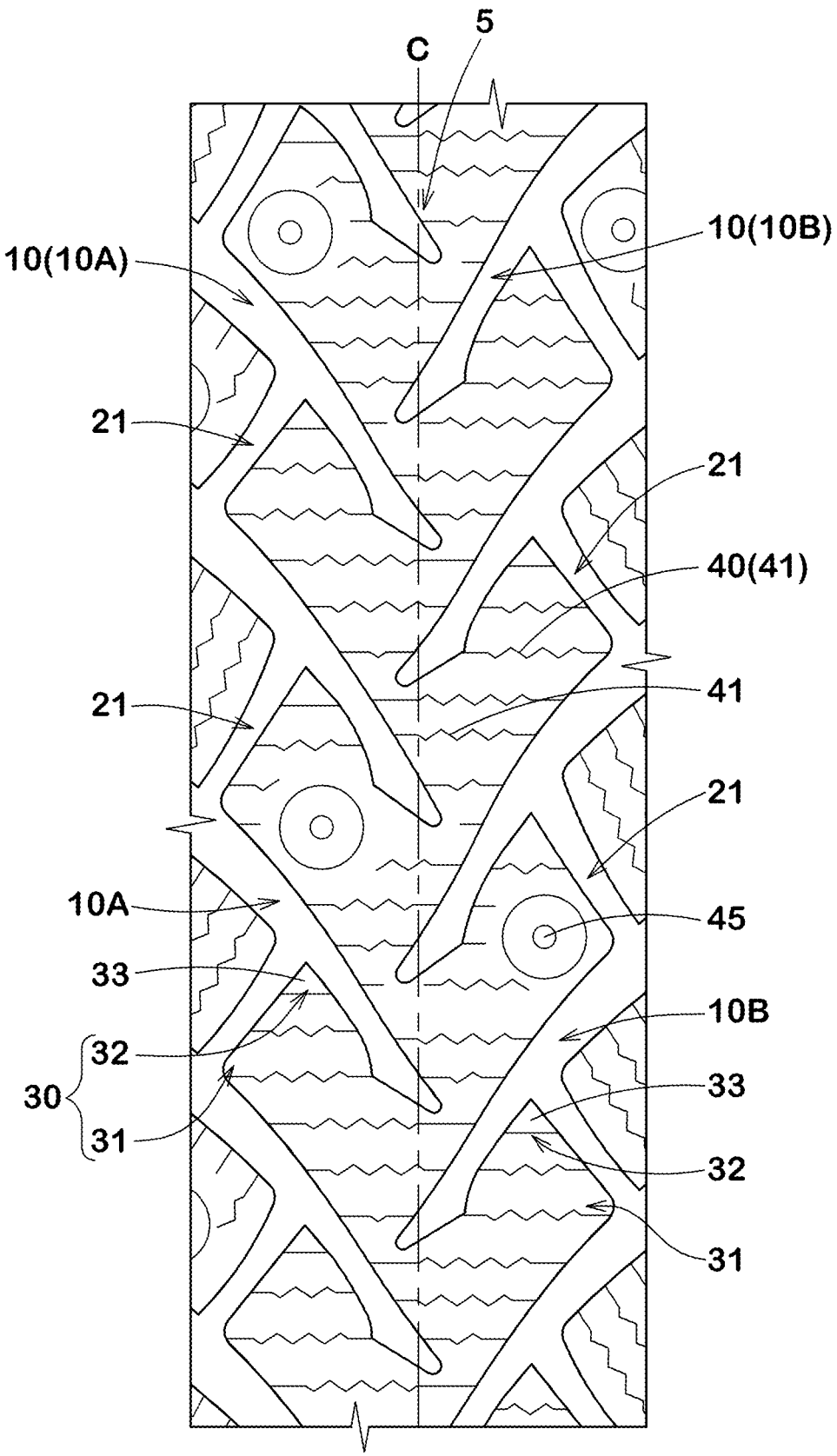
FIG. 3 is an enlarged view of a crown land region of FIG. 1.

FIG. 3 is an enlarged view of the crown land region 5. As shown in FIG. 3, the crown land region 5 in this embodiment is defined by a plurality of the first oblique grooves (10A), the first joint grooves 21 each of which connects between the first oblique grooves (10A) adjacent to each other, a plurality of the second oblique grooves (10B), and the first joint grooves 21 each of which connects between the second oblique grooves (10B) adjacent to each other, for example. Thereby, the crown land region 5 is provided at the center portion in the tyre axial direction of the tread portion 2, more specifically, provided on the tyre equator (C), for example.

Each of the oblique grooves 10 has the inner end described above, therefore, the crown land region 5 extends continuously over the entire circumference of the tyre 1 without being divided by a groove having a larger groove width than that of each of the sipes 40. In the crown land region 5 configured as such, excessive deformation is suppressed, therefore, it is possible that the steering stability on a dry road surface is improved eventually.

It is preferred that the crown land region 5 is provided with a plurality of crown sipes 41 each extending in a zigzag manner in the tyre axial direction, for example. The crown sipes 41 configured as such exert large frictional force by edges thereof on an icy/snowy road surface, therefore, it is possible that the traction performance is improved.

The crown sipes 41 in this embodiment include a full open sipe whose both ends are connected with any one of the grooves, for example. It is possible that the crown sipes 41 configured as such further increase the frictional force on an icy/snowy road surface.

The crown land region 5 includes corner portions 30 each defined between one of the oblique grooves 10 and one of the first joint grooves 21 connected therewith, for example. Each of the corner portions 30 includes a first corner portion 31 and a second corner portion 32, for example. The first corner portion 31 is formed by an edge of an end portion on the heel side in the tyre rotational direction (R) of each of the first joint grooves 21 and an edge of a respective one of the oblique grooves 10, for example. Thereby, the first corner portion 31 is convex toward the opposite side of the tyre equator (C). The second corner portion 32 is formed by an edge of an end portion on a toe side in the tyre rotational direction (R) of each of the first joint grooves 21 and the edge of a respective one of the oblique grooves 10, for example. Thereby, the second corner portion 32 is convex toward the toe side in the tyre rotational direction (R).

It is preferred that each of the second corner portions 32 includes a chamfered portion 33, for example. The chamfered portion 33 includes an inclined surface configured such that a part of the crown land region 5 between a ground contacting surface and one of sidewalls of the crown land region 5 is cut out. By the second corner portions 32 including the chamfered portions 33 configured as such, damage to the crown land region 5 on a dry road surface is suppressed.

Figure 4:
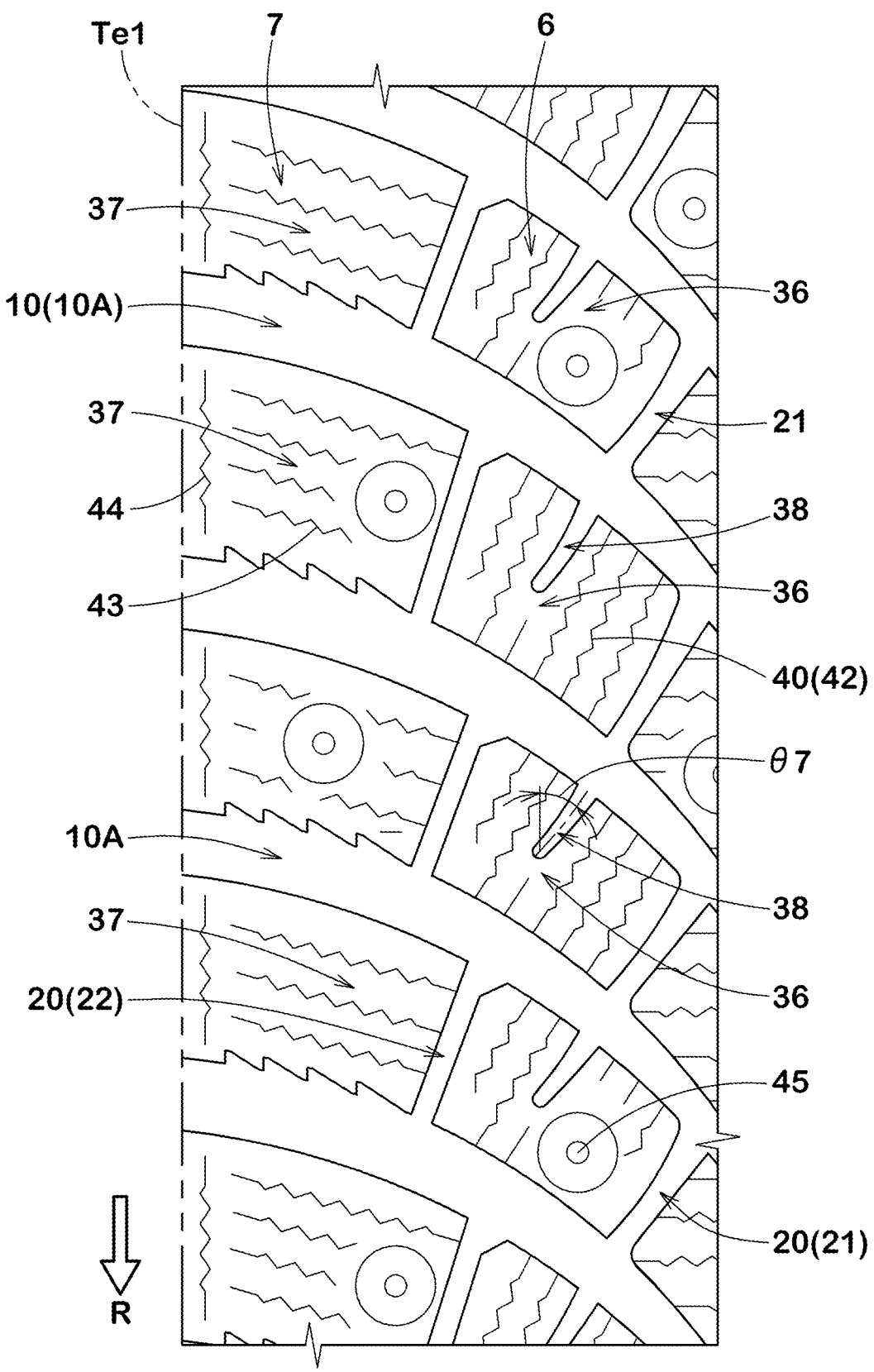
FIG. 4 is an enlarged view of one of middle block rows and one of shoulder block rows of FIG. 1.

FIG. 4 is an enlarged view of one of the middle block rows 6 and one of the shoulder block rows 7. As shown in FIG. 4, in each of the middle block rows 6, a plurality of middle blocks 36 are arranged in the tyre circumferential direction. Each of the middle blocks 36 is defined between one of the first joint grooves 21 and one of the second joint groove 22 adjacent thereto between a pair of the oblique grooves 10 adjacent to each other in the tyre circumferential direction.

It is preferred that each of the middle blocks 36 is provided with a lateral groove 38, for example. In each of the middle blocks 36, one end of the lateral groove 38 is connected with one of the oblique grooves 10 positioned on the toe side in the tyre rotational direction (R) of a respective one of the middle blocks 36, for example. Further, the other end of the lateral groove 38 terminates within a respective one of the middle blocks 36. The lateral grooves 38 con- figured as such suppress decrease in the rigidity of the middle blocks 36, therefore, it is possible that on-snow performance is improved while the steering stability on a dry road surface is maintained.

It is preferred that each of the lateral grooves 38 extends so as to be smoothly connected with its adjacent one of the first joint grooves 21 with its adjacent one of the oblique grooves 10 therebetween, for example. The expression "smoothly connected" includes an embodiment in which an extension of the first joint groove 21 in a longitudinal direction thereof intersects with at least a part of an end portion of the lateral groove 38 on a side of the oblique groove 10.

It is preferred that the lateral grooves 38 are inclined in the same direction as the first joint grooves 21, for example. It is preferred that each of the lateral grooves 38 is inclined at an angle θ7 in a range of from 30 to 50 degrees with respect to the tyre circumferential direction, for example. The lateral grooves 38 configured as such promote deformation of the middle blocks 36, therefore, it is possible that clogging of snow in the oblique grooves 10 and each of the joint grooves 20 is suppressed eventually.

As shown in FIG. 2, in a connecting portion between each of the oblique grooves 10 and one of the lateral grooves 38 connected thereto, an intersection point of an extension line of a groove center line of the lateral grooves 38 and the groove center line of the oblique groove 10 is defined as a third intersection point 28. It is preferred that a distance (L6) in the tyre axial direction between the tyre equator (C) and each of the third intersection points 28 is in a range of from 0.10 to 0.20 times the tread width (TW), for example.

As shown in FIG. 4, it is preferred that each of the middle blocks 36 is provided with a plurality of middle sipes 42, for example. Each of the middle sipes 42 in this embodiment extends in a zigzag manner, for example. Each of the middle sipes 42 as a whole extends in a different direction from each of the crown sipes 41 as a whole, for example. Each of the middle sipes 42 in this embodiment is inclined in the same direction as each of the joint grooves 20, for example. In a preferred embodiment, each of the middle sipes 42 extends along a corresponding one of the joint grooves 20. It is possible that the middle sipes 42 configured as such improve the traction and the cornering performance on an icy/snowy road surface.

In each of the shoulder block rows 7, a plurality of shoulder blocks 37 is arranged in the tyre circumferential direction. Each of the shoulder blocks 37 is defined on the outer side in the tyre axial direction of a respective one of the second joint grooves 22 between a respective pair of the oblique grooves 10 adjacent to each other in the tyre circumferential direction.

It is preferred that each of the shoulder blocks 37 is provided with a plurality of first shoulder sipes 43 and a second shoulder sipe 44 arranged on the outer side in the tyre axial direction of the first shoulder sipes 43, for example. Each of the first shoulder sipes 43 and the second shoulder sipes 44 in this embodiment extends in a zigzag manner, for example.

Each of the first shoulder sipes 43 extends in a different direction from the crown sipes 41 and the middle sipes 42, for example. Each of the first shoulder sipes 43 extends in an opposite direction to the middle sipes 42, for example. Each of the first shoulder sipes 43 in this embodiment extends along a corresponding one of the oblique grooves 10, for example. Further, the first shoulder sipes 43 includes a semi-open sipe which has one end connected with one of the second joint grooves 22 and the other end terminating within a respective one of the shoulder blocks 37 and a closed sipe whose both ends terminate within a respective one of the shoulder blocks 37. It is possible that the first shoulder sipes 43 configured as such improve the on-ice/on-snow performance and the steering stability on a dry road surface in a good balance.

Each of the second shoulder sipes 44 extends along the tyre circumferential direction, for example. Each of the second shoulder sipes 44 in this embodiment is a closed sipe whose both ends terminating within a respective one of the shoulder blocks 37, for example. The second shoulder sipes 44 configured as such are helpful for improving wandering performance on an icy/snowy road surface.

As shown in FIG. 1, it is preferred that the tyre 1 for winter in this embodiment is a stud tyre provided with a plurality of stud pins or stud pin holes 45, for example. The stud tyre configured as such effectively improves running performance on an icy road surface in particular. However, the tyre 1 for winter of the present invention is not limited to such an embodiment, and it may be used as a studless tyre not including a stud pin.

As shown in FIG. 1, it is preferred that land ratio (Lr) of the tread portion 2 in this embodiment is in a range of from 60% to 80%, for example. Thereby, the steering stability on a dry road surface and the on-ice/on-snow performance are improved in a good balance. In this specification, the term "land ratio" means a ratio Sb/Sa of a total area (Sa) of an imaginary ground contacting surface obtained by filling all the grooves and the sipes and the actual total ground contacting area (Sb).

From the similar point of view, rubber hardness (Ht) of a tread rubber forming the tread portion 2 is preferably in a range of from 45 to 60 degrees, more preferably in a range of from 50 to 56 degrees, for example. In this specification, the term "rubber hardness" means hardness measured by a type-A durometer under an environment of 23 degrees Celsius in accordance with Japanese Industrial standard JIS-K 6253.

While detailed description has been made of the tyre for winter as an embodiment of the present invention, the present invention can be embodied in various forms without being limited to the illustrated embodiment.

WORKING EXAMPLES (EXAMPLES)

Figure 5:
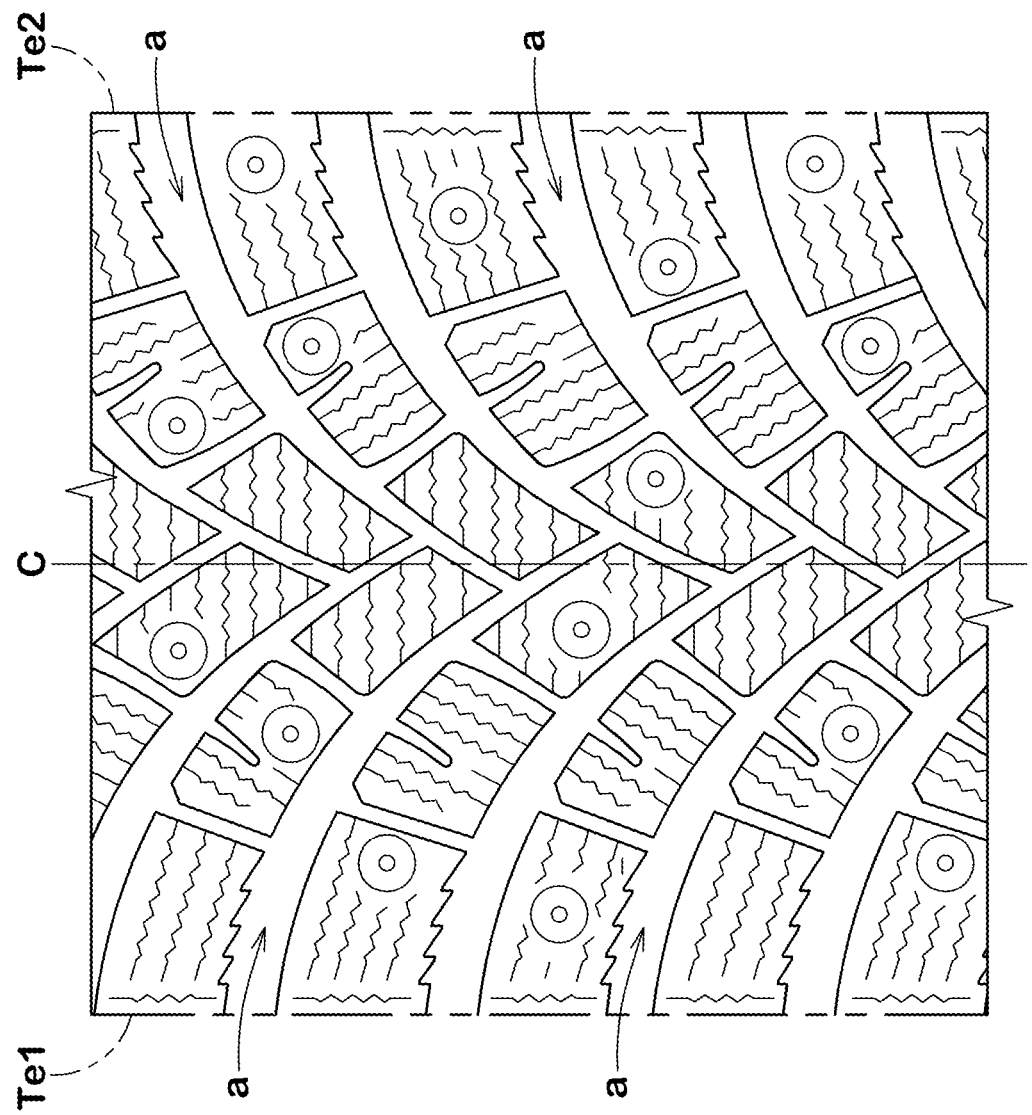
FIG. 5 is a development view of the tread portion of a tyre as Reference 1.
Figure 6:
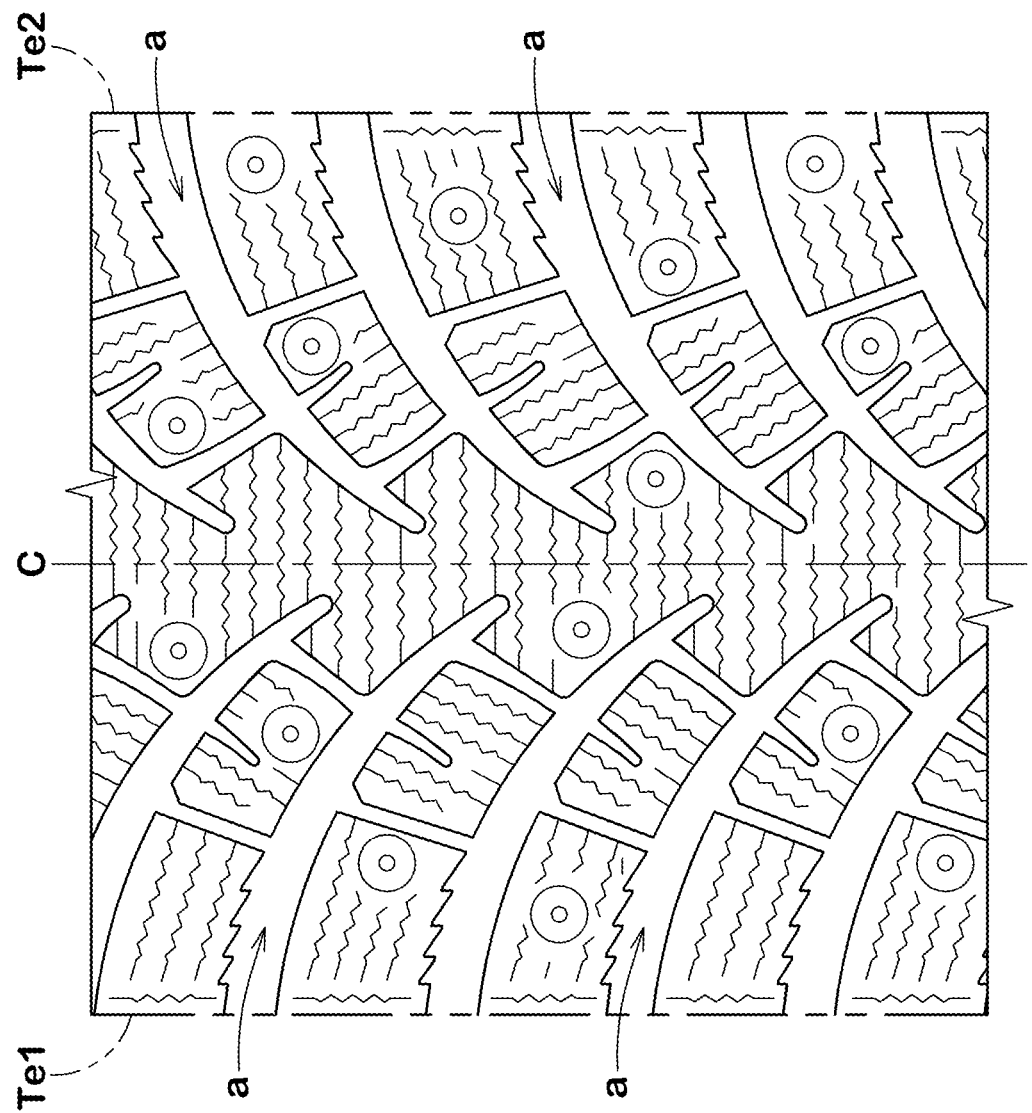
FIG. 6 is a development view of the tread portion of a tyre as Reference 2.

Pneumatic tyres of size 205/55R16 having the basic structure shown in FIG. 1 were made by way of test according to the specification listed in Table 1. As Reference 1, as shown in FIG. 5, tyres for winter in which an inner end of each of oblique grooves (a) is connected with other groove were made by way of test. As Reference 2, as shown in FIG. 6, tyres for winter in which the oblique grooves (a) terminate without crossing the tyre equator were made by way of test. Each of the test tyres was tested for the steering stability on a dry road surface and the on-ice/on-snow performance. Common specifications of the test tyres and the test methods were as follows.

Test car: displacement of 2000 cc
Test tyre mounting position: all wheels
Tyre rim: 16×6.5
Tyre inner pressure: 220 kPa at front wheels, 220 kPa at rear wheels
Tread ground contacting width: 173 mm
Groove depth of oblique groove: 8.9 mm
Land ratio: 70%
Rubber hardness of tread rubber: 56 degrees
<Steering Stability on Dry Road Surface>
While a driver drove the test car on a dry road surface of a circuit course, the steering stability was evaluated by the driver's feeling. The results are indicated by an evaluation point based on the Reference 1 being 100, wherein the larger the numerical value, the better the steering stability on a dry road surface is.
<On-Ice/On-Snow Performance>
While a driver drove the test car on an icy/snowy road surface, the running performance was evaluated by the driver's feeling.
The results are indicated by an evaluation point based on the Reference 1 being 100, wherein the larger the numerical value, the better the on-ice/on-snow performance is.
The test results are shown in Table 1.

TABLE 1

|  | Ref. 1 | Ref. 2 | Ex. 1 | Ex. 2 | Ex. 3 | Ex. 4 | Ex. 5 | Ex. 6 |
| --- | --- | --- | --- | --- | --- | --- | --- | --- |
|  | Figure showing tread pattern | | | | | | | |
|  | FIG. 5 | FIG. 6 | FIG. 1 | FIG. 1 | FIG. 1 | FIG. 1 | FIG. 1 | FIG. 1 |
| Distance (L1) between Tyre equator and Inner end of First oblique groove/ Width (W2) of Crown land region | — | 0.13 | 0.07 | 0.04 | 0.05 | 0.10 | 0.15 | 0.18 |
| Presence or Absence of Widened portion | Absence | Absence | Presence | Presence | Presence | Presence | Presence | Presence |
| Maximum groove width (W4) of Widened portion/ Maximum groove width (W3) of Main body portion | — | — | 0.50 | 0.50 | 0.50 | 0.50 | 0.50 | 0.50 |
| Steering stability on dry road surface [evaluation point] | 100 | 107 | 104 | 105 | 104 | 104 | 102 | 100 |
| On-ice/on-snow performance [evaluation point] | 100 | 94 | 103 | 100 | 102 | 103 | 104 | 104 |

TABLE 1-continued

|  | Ex. 7 | Ex. 8 | Ex. 9 | Ex. 10 | Ex. 11 | Ex. 12 | Ex. 13 |
|---|---|---|---|---|---|---|---|
| Figure showing tread pattern | FIG. 1 | FIG. 1 | FIG. 1 | FIG. 1 | FIG. 1 | FIG. 1 | FIG. 1 |
| Distance (L1) between Tyre equator and Inner end of First oblique groove/Width (W2) of Crown land region | 0.07 | 0.07 | 0.07 | 0.07 | 0.07 | 0.05 | 0.15 |
| Presence or Absence of Widened portion | Presence | Presence | Presence | Presence | Absence | Absence | Absence |
| Maximum groove width (W4) of Widened portion/Maximum groove width (W3) of Main body portion | 0.30 | 0.40 | 0.60 | 0.70 | — | — | — |
| Steering stability on dry road surface [evaluation point] | 102 | 104 | 104 | 101 | 105 | 105 | 103 |
| On-ice/on-snow performance [evaluation point] | 100 | 103 | 103 | 104 | 100 | 100 | 102 |

From the test results, it was confirmed that the tyres as Examples exerted excellent on-ice/on-snow performance and excellent steering stability on a dry road surface.

The invention claimed is:

1. A tyre for winter comprising a tread portion having a first tread edge and a second tread edge and sipes provided in at least a part of the tread portion, wherein
the tread portion is provided with a plurality of first oblique grooves each extending obliquely from the first tread edge toward the second tread edge,
each of the first oblique grooves has an inner end terminating between a tyre equator and the second tread edge,
the inner end is not connected with other grooves,
each of the first oblique grooves has a main body portion and a widened portion connected with the main body portion on a side of the second tread edge,
a groove width of the main body portion gradually decreases from the first tread edge toward the second tread edge,
a groove width of the widened portion is partially enlarged,
the tread portion has a directional pattern bound with an intended tyre rotational direction,
each of the first oblique grooves has a groove center line inclined over an entire length thereof to a heel side in the tyre rotational direction with respect to a tyre axial direction,
a maximum groove width of the widened portion is smaller than a maximum groove width of the main body portion, and
the maximum groove width of the widened portion is in a range of from 0.40 to 0.60 times the maximum groove width of the main body portion.

2. The tyre for winter according to claim 1, wherein none of the first oblique grooves intersect with other grooves between the tyre equator and the second tread edge.

3. The tyre for winter according to claim 1, wherein the tread portion includes a crown land region extending continuously over the entire circumference of the tyre without being divided by a groove having a larger groove width than that of each of the sipes, and
a distance in the tyre axial direction between the tyre equator and the inner end is in a range of from 0.05 to 0.15 times a maximum width in the tyre axial direction of the crown land region.

4. The tyre for winter according to claim 1, wherein
the tread portion includes a plurality of joint grooves each connecting between the first oblique grooves adjacent to each other in a tyre circumferential direction and middle blocks divided by the first oblique grooves and the joint grooves, and
each of the middle blocks is provided with a plurality of middle sipes each extending along one of the joint grooves respectively adjacent thereto.

5. The tyre for winter according to claim 4, wherein
each of the middle blocks is provided with a lateral groove having one end connected with one of the first oblique grooves positioned on a toe side in the tyre rotational direction of the each of the middle blocks.

6. The tyre for winter according to claim 1, wherein
the tread portion is provided with a plurality of second oblique grooves each extending obliquely from the second tread edge toward the first tread edge,
each of the second oblique grooves has an inner end terminating between the tyre equator and the first tread edge, and
the inner end of each of the second oblique grooves is not connected with other grooves.

7. The tyre for winter according to claim 1, wherein
between each pair of the first oblique grooves adjacent to each other in a tyre circumferential direction, one or a plurality of joint grooves each connecting between the each pair of the first oblique grooves are provided.

8. The tyre for winter according to claim 7, wherein
each of the joint grooves is inclined in an opposite direction to the first oblique grooves.

9. The tyre for winter according to claim 7, wherein
a plurality of the joint grooves is provided between each pair of the first oblique grooves adjacent to each other in the tyre circumferential direction,
the joint grooves include a first joint groove and a second joint groove,
the second joint groove is arranged on an outer side in the tyre axial direction of the first joint groove, and
the second joint groove is inclined at an angle smaller than an inclination angle of the first joint groove with respect to the tyre circumferential direction.

10. The tyre for winter according to claim 1, wherein
the widened portion has a groove width increasing continuously from the main body portion toward the tyre equator to become the maximum groove width before the tyre equator, and then decreasing continuously as the widened portion extends to cross and beyond the tyre equator and then the widened portion terminates to form the inner end.

11. The tyre for winter according to claim 1, wherein
the widened portion has a heel-side edge and a toe-side edge,
the heel-side edge is bent so as to have a peak protruding in a direction away from the toe-side edge, and
the toe-side edge extends in a continuous arc shape without bending.

12. The tyre for winter according to claim 11, wherein
the toe-side edge has an angle continuously increasing from the first tread edge side toward the inner end with respect to the tyre axial direction, and
an inclination angle of the groove center line of the main body portion of each of the first oblique grooves continuously increases over an entire length thereof from the first tread edge side toward the inner end with respect to the tyre axial direction.

13. The tyre for winter according to claim 1, wherein
the widened portion has a toe-side edge, and
the toe-side edge has an angle continuously increasing from the first tread edge side toward the inner end with respect to the tyre axial direction.

14. The tyre for winter according to claim 1, wherein
an inclination angle of the groove center line of the main body portion of each of the first oblique grooves continuously increases over an entire length thereof from the first tread edge toward the inner end with respect to the tyre axial direction, and
the widened portion is not connected with other grooves.

15. A tyre for winter comprising a tread portion having a first tread edge and a second tread edge and sipes provided in at least a part of the tread portion, wherein
the tread portion is provided with a plurality of first oblique grooves each extending obliquely from the first tread edge toward the second tread edge,
each of the first oblique grooves has an inner end terminating between a tyre equator and the second tread edge,
the inner end is not connected with other grooves,
each of the first oblique grooves has a main body portion and a widened portion connected with the main body portion on a side of the second tread edge,
a groove width of the main body portion gradually decreases from the first tread edge toward the second tread edge,
a groove width of the widened portion is partially enlarged,
the tread portion has a directional pattern bound with an intended tyre rotational direction,
each of the first oblique grooves has a groove center line inclined over an entire length thereof to a heel side in the tyre rotational direction with respect to a tyre axial direction,
each of the widened portions has an apex at which the widened portion has a locally maximum groove width, and
a distance in the tyre axial direction from the apex of each of the widened portions to the tyre equator is greater than a distance in the tyre axial direction from each of the inner ends to the tyre equator.

16. The tyre for winter according to claim 15, wherein
the tread portion includes a crown land region extending continuously over the entire circumference of the tyre without being divided by a groove having a larger groove width than that of each of the sipes, and
a distance in the tyre axial direction between the tyre equator and the inner end is in a range of from 0.05 to 0.15 times a maximum width in the tyre axial direction of the crown land region.

17. A tyre for winter comprising a tread portion having a first tread edge and a second tread edge and sipes provided in at least a part of the tread portion, wherein
the tread portion is provided with a plurality of first oblique grooves each extending obliquely from the first tread edge toward the second tread edge,
each of the first oblique grooves has an inner end terminating between a tyre equator and the second tread edge,
the inner end is not connected with other grooves,
each of the first oblique grooves has a main body portion and a widened portion connected with the main body portion on a side of the second tread edge,
a groove width of the main body portion gradually decreases from the first tread edge toward the second tread edge,
a groove width of the widened portion is partially enlarged,
the tread portion includes a crown land region extending continuously over the entire circumference of the tyre without being divided by a groove having a larger groove width than that of each of the sipes,
a distance in a tyre axial direction between the tyre equator and the inner end is in a range of from 0.05 to 0.15 times a maximum width in the tyre axial direction of the crown land region,
the tread portion is provided with a plurality of second oblique grooves each extending obliquely from the second tread edge toward the first tread edge,
each of the second oblique grooves has an inner end terminating between the tyre equator and the first tread edge, and
the inner end of each of the second oblique grooves is not connected with other grooves.

18. The tyre for winter according to claim 17, wherein
an inclination angle of the groove center line of the main body portion of each of the first oblique grooves continuously increases over an entire length thereof from the first tread edge toward the inner end with respect to the tyre axial direction, and
the widened portion is not connected with other grooves.

19. The tyre for winter according to claim 17, wherein
a maximum groove width of the widened portion is smaller than a maximum groove width of the main body portion, and
the maximum groove width of the widened portion is in a range of from 0.40 to 0.60 times the maximum groove width of the main body portion.

* * * * *